Dec. 29, 1970 J. R. CIELO 3,551,858

HIGH CURRENT FEED-THROUGH FILTER SYSTEM

Filed June 14, 1967

INVENTOR
JOHN R. CIELO

BY Frederick D. Poag
ATTORNEY

United States Patent Office 3,551,858

Patented Dec. 29, 1970

3,551,858

HIGH CURRENT FEED-THROUGH FILTER SYSTEM

John R. Cielo, Hurley, N.Y., assignor to International Business Machines Corporation, Armonk, N.Y., a corporation of New York Filed June 14, 1967, Ser. No. 646,076

Int. Cl. H01h *7/14*

U.S. Cl. 333—79 9 Claims

ABSTRACT OF THE DISCLOSURE

A compact filter usable in high current circuits for the suppression of common mode noise and particularly adaptable to construction as a feed-through fitting for an interference shield, comprises a plurality of linear conductors disposed generally axially within a cylinder of ferrite material which itself is disposed within a cylindrical conductive sheath by which the device may be mounted in the shield. Common mode signals on the conductors see the inductive and resistive serial impedance presented by the ferrite and capacitative shunt impedance through the ferrite to the sheath. Closed circuit signals in the conductors exhibit mutually cancelling fields so that the ferrite is not saturated. Nested configuration of the conductors minimize signal leakage. The ferrite material may comprise plural axially adjacent segments of differing frequency response.

BACKGROUND, BRIEF SUMMARY AND OBJECTS OF THE INVENTION

This invention relates to electrical filter systems and more particularly an improved filter suitable for use as a high current feed-through in a radio frequency interference (RFI) shield or the like.

The advent of data processing equipment having large current low voltage power systems and small voltage signal characteristics has created an increased demand for power feed arrangements which have high current capacity, fit within or adjacent a minimum aperture in an RFI shield to constitute minimum disruption of the shield, and have a filtering efficiency required to suppress spurring signals to well below the useful signal value. The general principles common to most RFI filters are well known. The objective is to provide an impedance in series with the noise source, and a shunt impedance path to ground forming a so-called RFI sink. However, filters which were adequate for high voltage-low current vacuum tube circuits do not lend themselves to simple redesign for the aforedescribed high current, low voltage service. Conventional inductors and capacitors become too bulky to be incorporated closely into a shield. The result is a structure which is incompatible with high-density design concepts, and, worse in some cases, is incapable of being integrated into a shield feed-through so as to serve as an RFI barrier therein.

The present invention combines a number of principles to overcome these difficulties. First, reliance is placed on the fact that most RFI is "common mode," that is, it is conducted in a circuit including ground return, as opposed to the useful circuit comprised of outgoing and return conductors. Thus, if the outgoing and return conductors are coupled in opposition in the filter inductor, their fields will cancel while the common mode noise signal alone will magnetize the inductor. This permits minimization of the size of the core of the inductor while avoiding saturation thereof. Secondly, employment of high permeability ferrite core material in the core permits use of a "one turn," or straight-through winding arrangement, so that the inductor has the configuration of a current feed-through and can be used as such. Thirdly, incorporation of the core itself as the dielectric in a shunt capacitor structure yields a compact RFI sink and enables the employment of high frequency energy loss characteristic of the ferrite to further enhance the desired noise energy dissipation.

Fourthly, in preferred embodiments of the invention the conductors configured to form a cylinder which fits tightly within the core which is itself cylindrical. Thus, only a minimum opening is required through the core structure even where each of the conductors must be of very substantial cross-section. Additionally, the cylindrical core arrangement facilitates the employment of a series of two or more core sections of different materials, such as may be desired for efficient filtering of noise of different frequency ranges, with each of the core sections being closely coupled to the conductors passing therethrough.

Accordingly, it is a principal object of this invention to provide an improved electrical noise filter system characterized by a filter having a compact configuration which adapts it well to use as the feed-through element in an RFI shield.

It is another object of the invention to provide an improved filter element as aforesaid having a high current capacity while being sensitive to small value common mode noise signals.

It is still another object of the invention to provide an improved feed-through filter element as aforesaid in which the size of the aperture through the magnetic shield structure thereof is minimized.

Further objects of the invention are to provide an improved filter element as aforesaid characterized by a compound core structure having a plurality of core sections of different materials having different frequency response characteristics, each coupled closely to the conductors of the circuit to be filtered, and each in alignment with the axis of the filter element so as to effectively close the aperture of a shield in which it constitutes a current feed-through.

The foregoing and other objects, features and advantages of the invention will be apparent from the following more particular description of a preferred embodiment of the invention as illustrated in the accompanying drawings.

DETAILED DESCRIPTION

Figure 1:
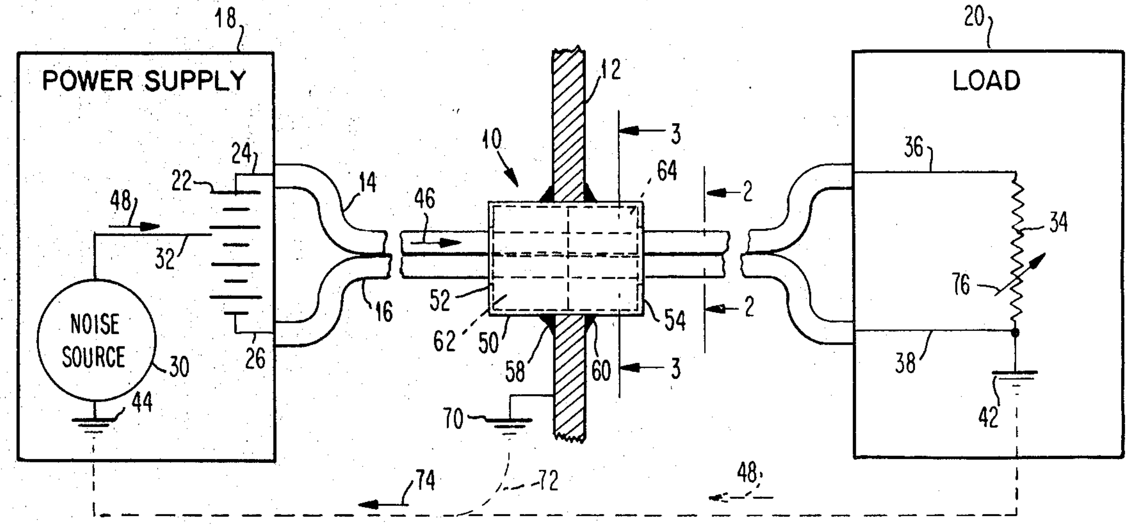
FIG. 1 is a partially schematic, partially sectioned, view of a filter system embodying the invention.
Figure 2:
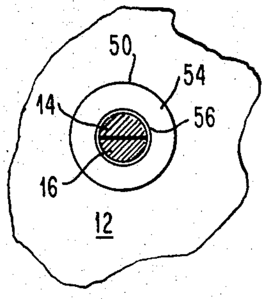
FIGS. 2 and 3 are fragmentary sectional views taken about along lines 2—2 and 3—3, respectively.

Referring more particularly to FIG. 1, a filter element 10 of the invention may be disposed in an RFI shield 12 so as to form a feed-through for outgoing and return conductors 14, 16 by which, for example, power is fed from a supply 18 to a load 20. For purposes of illustration only, the power supply 18 is shown with the schematic representation of a battery 22 having leads 24, 26 connected to the conductors 14, 16. The power supply is shown to contain also a noise source 30 which radiates or otherwise couples an undesirable high frequency noise signal to the circuit of the battery, as indicated by the diagrammatic showing of an antenna element 32. Also for purposes of illustration only, the load 20 is shown to comprise a resistor 34 connected by leads 36, 38 to the feed conductors 14, 16.

In actuality, the power supply 18 might contain very complex circuitry including, for example, switching elements in a regulator portion which introduce the undesired noise. Alternatively, the source of the noise could be from elsewhere in the environment; the exact nature of the noise source is unimportant. Similarly, the load 20 may comprise many and complex circuits, such as computer circuits, which could operate in an erroneous manner if exposed to the noise signal.

For safety and other reasons it is common practice to ground the load, as indicated at 42. The noise source 30 also has some reference to ground, capacitative or otherwise, as indicated at 44, so that common mode noise signals 46 set up by the source noise signal 48 tend to flow in the conductor 14, through the load element 34 and back through ground as indicated at 48. This undesirable flow through the conductor system is blocked by the filter element 10 of the invention. To suppress radiant transfer of the noise signal from the source to the load, the RFI shield 12 is interposed between them, and the filter 10 forms a feed-through for passage of the conductors 14, 16 through the shield.

The filter element 10 comprises a conductive metal shell 50 which may have in-turned end wall portions which pass, with a small clearance 56, the conductors 14, 16 of the circuit to be filtered. The shell 50 may desirably constitute the structure by which the filter element is mounted in the shield 12, as indicated by the welds 58, 60. Ferrite (ceramic ferromagnetic) material is interposed between the conductors and the shell in such manner as to surround the conductor combination with a magnetic path and at the same time provide a capacitative path to the shell 50. This ferrite material may be provided in form of a plurality of portions of differing composition for achieving a selected frequency response, with the portions configured as cylinders 62, 64 arranged coaxially and in series along the conductor 14, 16 combination and the shell 50.

Preferably, the portions of the conductors 14, 16 within the filter element 10 are given a nested shape so as to present a compact structure requiring only a minimum aperture in the ferrite and providing close coupling thereto. In the general case where the common mode noise signal to be suppressed can be on either or both of the conductors 14, 16 (even where one conductor 16 is grounded at one or both ends, impedance in the ground connections and in the conductor itself can sometimes permit the presence of the noise signal in conductor 16 as well as in conductor 14), it is preferred that the conductors are of segmental shape as shown, so that each bears the same relationship to the ferrite. The conductors are separated from each other by a layer 66 of insulation.

Figure 3:
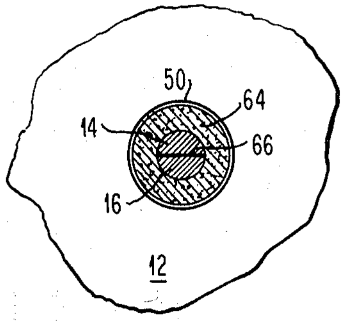

Another and perhaps more important reason for providing the same magnetic coupling between each of the conductors 14, 16 and the ferrite is to provide cancellation of magnetic fields set up by the load current in the conductors. As seen in FIG. 1, this current flows from left to right in one conductor 14 and from right to left in the other conductor 16. The resulting magneto-motive force in the ferrite 62, 64 would be, as seen in FIG. 3, counter-clockwise for conductor 14, and clockwise for conductor 16. The resulting substantial mutual cancellation of these MMF's in the ferrite permits minimization of the bulk of the ferrite without danger of saturation even where, as will be set forth below, the load currents are very large.

Figure 4:
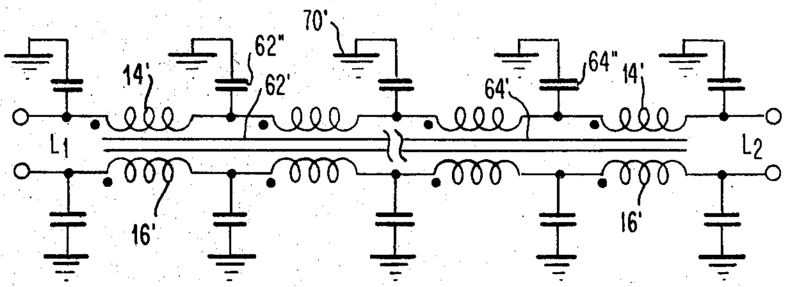
FIG. 4 is a diagram illustrative of the equivalent circuit of the filter elements of the system of FIG. 1.

The equivalent circuit of the filter element 10 is illustrated in FIG. 4, wherein like reference numerals, with superscripts added, are used to key the parts of the figure to corresponding parts in FIG. 1. The circuit as illustrated comprises series of inductor windings 14′ and 16′ cooperative with the ferrite core portions 62′ to 64′ to yield inductances L1 and L2 in series insofar as common mode current signals are concerned. At the same time the ferrite materials 62″ and 64″ provide dielectric in capacitative shunt paths to ground. Therefore, the unwanted common mode signals are blocked by the series impedance and bled to ground through the shunt impedance. Participating also in the shunt "RFI Sink" is the dielectric loss in the ferrite. As is well understood in the art, this loss becomes a significant factor in dissipating the unwanted signals at higher frequencies where the dielectric constant of the ferrite decreases.

The filter system of the invention has particular utility in very high current, very low voltage power systems such as are coming into use in the data processing technology. For example, the load current in the circuit of conductors 14, 16 may be one hundred amperes or more, at a potential of under five volts. Particularly because of the low operating voltage characteristics of the load, spurious signals on the power lines in the order of a fraction of a volt may be intolerable. So also, radiated signals may affect the load undesirably. The shield 12, which is grounded as indicated at 70, intercepts radiated noise between the supply 18 and the load 20, and also provides a conductive path from the filter shell 50 for a return circuit, as indicated at 72, 74, for the conductive noise signals which are blocked by the inductance of the filter. Thus the filter and the shield cooperate to reduce the noise signal 48 through the load to an acceptable value.

It should be understood that the "common mode" noise signals blocked by the filter of the invention need not be present equally in the conductors 14, 16. Rather, what is meant by "common mode" is that the signal is present in at least one of the conductors but participates in a circuit which does not return through the other; for example, it typically returns through ground as shown. This distinguishes from the balanced currents which pass in circuit through conductor 14 and 16 in series with each other, that is, in opposite directions through the filter.

Moreover, it should be understood that the filter system is equally effective in preventing reflection of dynamic operation of the load to the exterior beyond the shield 12. Such dynamic operation of the load, indicated by the arrow 76 in FIG. 1, may result in common mode signals arising from capacitative assymmetries in the system. These signals, although possibly resulting from the useful operation of the load, would constitute noise in the sense that their radiation or transmission in this manner would be undesired. This can be true even if, in variations of the role of the filter system, the balanced current signal on lines 14, 16 might actually be the useful signal. In such cases, the filter system of the invention would present little series impedance to the wanted signal while blocking the unwanted common mode noise signals.

Thus, while the invention has been particularly shown and described with reference to a preferred embodiment thereof, it will be understood by those skilled in the art that the foregoing and other changes in form and details may be made therein without departing from the spirit and scope of the invention.

What is claimed is:

1. In a filter system, a plurality of conductors in circuit for conveying electrical current, and means for suppressing transmission of common mode noise in said conductors, said means comprising a radio frequency shield, and cylindrical body means of ferrite mounted in an aperture through said shield, lineal sections of said conductors being disposed in parallel and generally axially through said cylindrical body means, whereby, unbalanced signals in said conductors set up magnetic fields linking said ferrite additively while balanced signals set up mutually cancelling fields, said lineal sections of said conductors being nested to form a combination having substantially solid cross-section, fitted tightly within said cylindrical body means.

2. The combination of claim 1, wherein said conductors constitute a circuit pair and said lineal sections thereof are of semi-circular cross-section.

3. In a filter system, a plurality of conductors in circuit for conveying electrical current, and means for suppressing transmissions of common mode noise in said conductors, said means comprising cylindrical body means of ferrite, lineal sections of said conductors being disposed in parallel and generally axially through said cylindrical body means, whereby, unbalanced signals in said conductors set up magnetic fields linking said ferrite additively while balanced signals set up mutually cancelling fields, said ferrite body means comprising a plurality of coaxially arranged portions of differing frequency response characteristics.

4. In a filter system, a plurality of conductors in circuit for conveying electrical current, and means for suppressing transmission of common mode noise in said conductors, said means comprising cylindrical body means of ferrite, lineal sections of said conductors being disposed in parallel and generally axially through said cylindrical body means, whereby, unbalanced signals in said conductors set up magnetic fields linking said ferrite additively while balanced signals set up mutually cancelling fields, a conductive shell superimposed over said body means to form, with said conductor means, capacitor means comprising said ferrite as its dielectric, and means connected to said shell for providing a shunt circuit path for diverting said common made signals.

5. The combination of claim 4, wherein said means connected to said shell comprises a radio frequency shield.

6. In a filter system, a plurality of conductors in circuit for conveying electrical current, and means for suppressing transmission of common mode noise in said conductors, said means comprising cylindrical body means of ferrite, lineal sections of said conductors being disposed in parallel and generally axially through said cylindrical body means, whereby, unbalanced signals in said conductors set up magnetic fields linking said ferrite additively while balanced signals set up mutually cancelling fields, said lineal sections of said conductors being nested to form a combination having substantially solid cross-section, fitted tightly within said cylindrical body means, a conductive shell superimposed over said body means to form, with said conductor means, capacitor means comprising said ferrite as its dielectric, and means connected to said shell for providing a shunt circuit path for diverting said common mode signals.

7. The combination of claim 6, wherein said means connected to said shell comprises a radio frequency shield, and wherein said shell is mounted in an aperture through said shield with said conductors oriented with respect to said shield to constitute a feed-through therefor.

8. The combination of claim 7, wherein said conductors constitute a circuit pair and said lineal sections thereof are of semi-circular cross-section.

9. The combination of claim 7 wherein said ferrite body means comprises a plurality of coaxially arranged portions of differing frequency response characteristics.

References Cited

UNITED STATES PATENTS

| | | | |
|---|---|---|---|
| 2,865,006 | 12/1958 | Sabaroff | 333—33 |
| 3,025,480 | 3/1962 | Guanella | 333—33 |
| 3,309,633 | 3/1967 | Mayer | 333—79 |
| 3,329,911 | 7/1967 | Schlicke et al. | 333—79 |
| 3,297,969 | 1/1967 | Kaufman et al. | 333—79 |
| 2,509,057 | 12/1958 | Guanella | 333—33 |
| 3,399,340 | 8/1968 | Podell | 333—33 |
| 3,425,004 | 1/1969 | Warner | 333—79 |

HERMAN KARL SAALBACH, Primary Examiner

C. BARAFF, Assistant Examiner

U.S. Cl. X.R.

333—81; 178—45